United States Patent [19]

Turner et al.

[11] 3,736,072
[45] May 29, 1973

[54] SYSTEMS FOR THE SUPPLY OF LIQUID FUEL TO GAS-TURBINE ENGINES

[75] Inventors: Horace George Turner, Chandler's Ford; Robert Spurgeon Wood, Gosport, both of England

[73] Assignee: Plessey Handel Und Investments A.G., Zug, Switzerland

[22] Filed: Aug. 24, 1971

[21] Appl. No.: 174,366

[30] Foreign Application Priority Data
Aug. 25, 1970 Great Britain.....................40,897/70

[52] U.S. Cl...................417/79, 60/39.28 R, 417/87, 417/197
[51] Int. Cl........F04b 23/04, F04b 23/14, F02c 9/04
[58] Field of Search.....................417/79, 80, 81, 82, 417/87, 88; 60/39.28 R

[56] References Cited

UNITED STATES PATENTS

| 2,812,715 | 11/1957 | Redding et al. | 417/79 |
| 3,551,073 | 12/1970 | Petrovits | 417/87 X |
| 2,990,103 | 6/1961 | Coanda et al. | 417/197 |
| 2,953,156 | 9/1960 | Bryant | 417/79 X |

Primary Examiner—Carlton R. Croyle
Assistant Examiner—Richard E. Gluck
Attorney—Blum, Moscovitz, Friedman & Kaplan

[57] ABSTRACT

To permit the booster pumps in aircraft wing tanks to be switched-off immediately after starting of the engine, thus reducing the fire hazards in the event of a crash, without endangering the maintenance, even at high altitude, of adequate pressure at the inlet 4a of an engine-driven fixed-displacement main fuel pump, the energy of the spill flow is utilized in an injector-type pump to boost the pressure of the fuel in the supply line leading from a backing pump to the main fuel pump. A novel form of injection-type pump is also described which makes use of the Coanda wall-attachment effect.

5 Claims, 7 Drawing Figures

SYSTEMS FOR THE SUPPLY OF LIQUID FUEL TO GAS-TURBINE ENGINES

The present invention relates to the supply of liquid fuel to gas-turbine engines and is more particularly, though perhaps not exclusively, intended for use in aircraft.

In aircraft gas-turbine engines it is the usual practice to supply fuel to the engine by an engine-driven positive-displacement main fuel pump which delivers fuel at a rate proportional to engine speed and at a suitably high pressure to a fuel-control unit which causes the excess of this delivery over the momentary fuel requirement of the engine to return to the inlet side of the pump.

This main fuel pump is preceded by a dynamic pump, known as backing pump and generally likewise engine-driven, which maintains at the inlet of the main fuel pump a pressure sufficient to prevent cavitation phenomena in, and ensure accurate flow metering by, the main fuel pump. In order to ensure continuity of fuel supply to the backing pump, especially at high altitudes when the ambient pressure is very low from the fuel tanks, which often are built into the wings of an aircraft, and also because dynamic pumps are not reliably self-priming, it is furthermore usual to arrange inside, or closely adjacent to, each fuel tank a low-pressure further dynamic pump, known as a booster pump, in a position in which fuel will reach it by gravity even when the tanks are nearly empty. These booster pumps are each driven independently of the engine, generally by an electric motor, and there is therefore a risk that in the case of fire resulting from a crash involving fracture of the fuel-pipe system, the booster pumps will, even when the engine has stopped, continue to feed fuel from the tanks and thus sustain the fire.

On the other hand it is not advisable in a fuel system as hitherto constructed to switch-off the booster pumps as soon as the backing pumps have been primed on starting the engine, because, more particularly in order to keep the weight of the equipment down, the backing pump employed is not in all circumstances sufficient to provide, without the assistance of a booster pump, the required minimum pressure at the inlet to the main fuel pump. This risk is particularly relevant at high altitudes and correspondingly low ambient air pressures, and is thus liable to impose an altitude limitation due to cavitation.

The present invention has for an object to provide an improved fuel system which, by reducing this risk makes it practicable to switch-off the booster pumps once the engine has been started, thereby reducing the fire hazard in the case of a crash.

According to the invention a system for supplying fuel to a gas-turbine engine of an aircraft comprises a fuel tank; a positive-displacement main fuel pump driven at a speed proportional to that of the engine and having an inlet connected to said tank by a fuel-intake line, and an outlet leading to said engine; a booster pump arranged in at least close proximity to the tank and operable to raise the pressure energy of liquid fuel entering said line from said tank, said booster pump having driving means independent of the engine; a backing pump included in said line between said booster pump and said main fuel pump for simultaneous operation with the main fuel pump to raise the pressure of liquid fuel entering the main fuel pump from said line; fuel regulator means interposed between said outlet of the engine and operative to return to said intake line the excess of the fuel delivered by said main fuel pump over the momentary fuel requirements of the engine; a jet pump interposed between the backing pump and the inlet of the main fuel pump to raise the pressure of the liquid entering the main fuel pump from the backing pump, said jet pump having a jet inlet arranged to be fed with fuel thus returned by said regulating means and switch-off means operable to de-energise the driving means of the booster pump without affecting the operation of the main fuel pump and the backing pump.

The effectiveness of the invention is assisted by the fact that, while the delivery of the main fuel pump is substantially proportional to engine speed, the ratio of the fuel requirement of the engine to its speed generally decreases as the ambient air pressure decreases with rising altitude, so that under the very conditions under which the pressure delivered by the unassisted backing pump is liable to become insufficient to prevent cavitation at the inlet to the main fuel pump, a relatively large volume of spill flow is available.

On the other hand the invention is not strictly limited to use with a fixed-displacement main fuel pump, since in the case of pumps which do not rely on the spilling of excess fuel for varying the amount of fuel delivered to the engine, it would be feasible to introduce a spill flow for the purpose of augmenting the pressure in the pump inlet.

In order that the invention may be more readily understood, reference will now be made to the accompanying drawings, in which.

Figure 3:
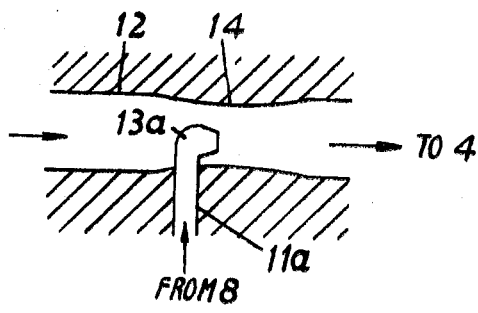
Figure 4:
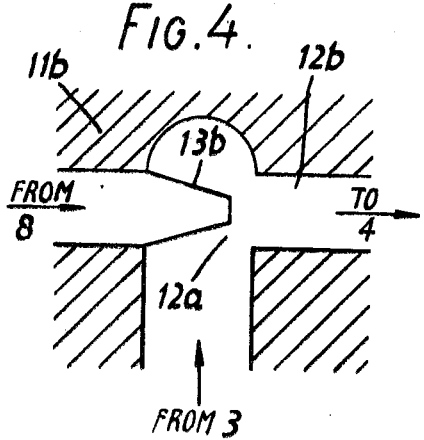

FIGS. 3 and 4 respectively illustrate two modified spill-flow jet-injector arrangements.

Figure 5:
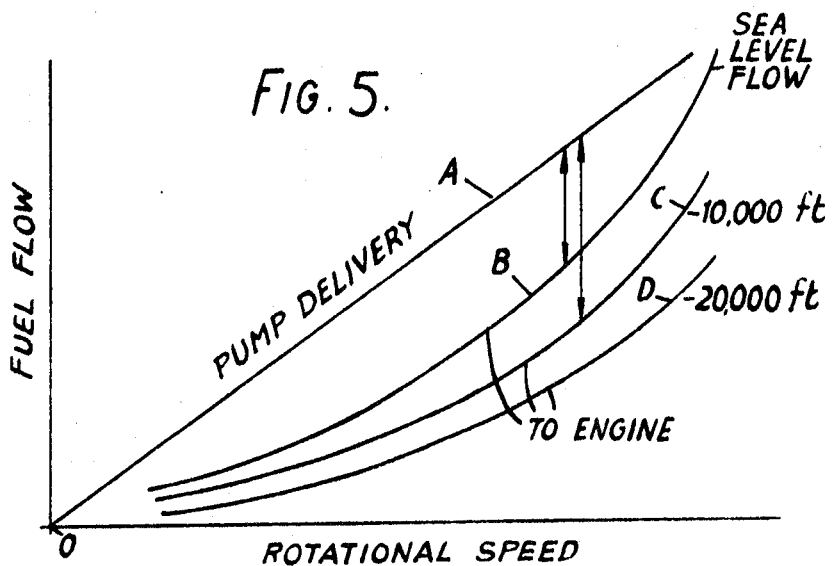
Figure 6:
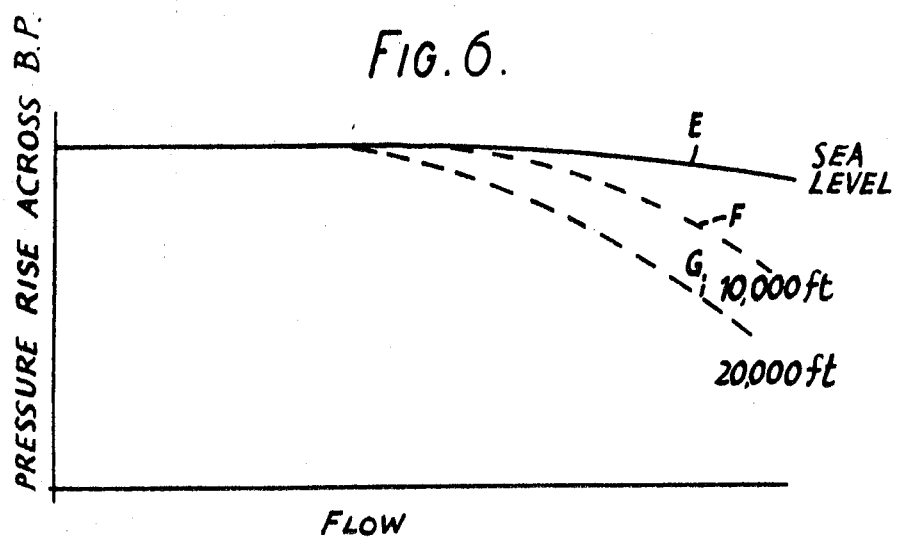

FIG. 5 is a group of graphs respectively showing the delivery of an engine-driven main fuel pump of the constant-displacement type and the fuel requirements of a gas turbine engine for various altitudes all plotted as functions of the engine speed, and FIG. 6 is a group of graphs respectively showing for various altitudes the pressure rise produced by an engine-driven dynamic backing pump plotted as a function of the delivery flow required by the engine.

Figure 1:
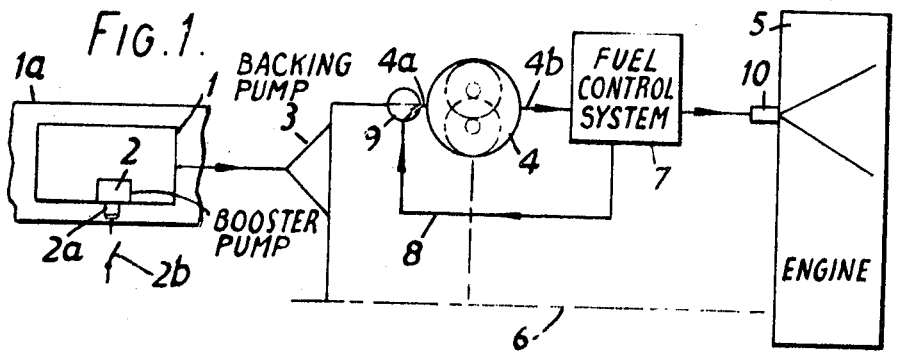
FIG. 1 is a diagramatic layout of a fuel system incorporating one form of the invention.

Referring now first to the conventional features of FIG. 1, fuel from a tank 1 accommodated in an aircraft wing 1a is supplied by a booster pump 2 provided in the tank and driven by an individual electric motor 2a to the inlet of a fuel-backing pump 3, which passes the fuel on to the inlet 4a of a gear-type main fuel pump 4 and raises its pressure from the delivery pressure of the booster pump 2 to a value sufficient to prevent the risk of cavitation in the main fuel pump.

Both the backing pump 3 and the main fuel pump 4 are driven at a constant ratio from the shaft 6 of the turbo-engine 5 to which the fuel is supplied, so that fuel is delivered at the outlet 4b of the main fuel pump under high pressure at a rate substantially proportional to engine speed to a fuel-control system 7. The latter causes the quantity of fuel per revolution supplied to the burners 10 of the engine 5 to vary according to a variety of data and achieves this variation by diverting the excess fuel to a spill line 8, which leads back to the inlet 4a of the main fuel pump. While, however, in hitherto known systems this spill line joined the inlet in a plain T-junction or in a small mixing chamber, according to the invention the junction is so constructed as to utilise the energy of the spill flow to increase the pressure at the inlet 4a of the main fuel pump. In the construction illustrated in FIG. 1 this is achieved by the provision of an injector-type jet pump 9 utilising the kinetic energy of the spill flow.

Figure 2:
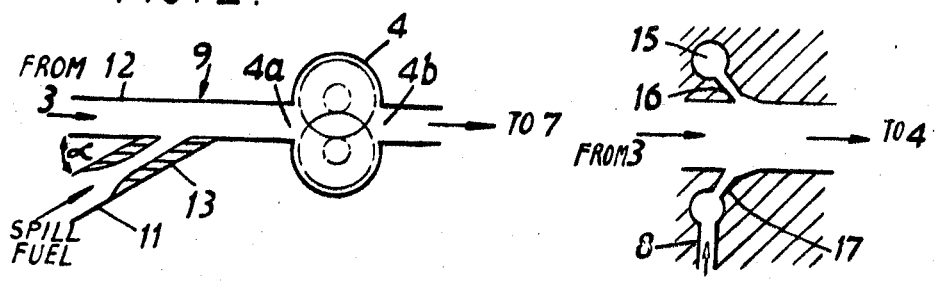
FIG. 2 is a diagrammactic sectional elevation of the spill-flow jet injection arrangement thereof.

The main fuel pump 6 and jet pump 9 of FIG. 1 are shown in more detail, and to a larger scale, in FIG. 2.

An injection line 11, carrying the spill fuel returned via spill line 8, opens at an acute angle into the line 12 which serves to deliver the fuel supplied by the backing pump 3 to the inlet 4a of the main fuel pump 4 so that the velocity of the spill-fuel flow increases the pressure at main-pump inlet 4a. Preferably the bore of injection line 11 is reduced in its outlet end as shown at 13 to form an injection nozzle adapted to convert at its outlet 43 part of the pressure produced by the main fuel pump into kinetic energy as the spill flow enters the liquid in line 12, in which the pressure is much lower.

Figure 2A:
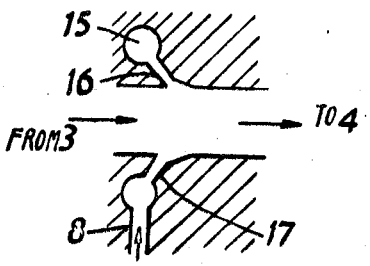
FIG. 2a shows a modification in which the Coanda wall attachment effect is utilised instead of the action of a jet.

FIG. 2a illustrates a modified arrangement, which may be employed in place of the jet injector arrangement shown at 9 in FIG. 2, and which is believed to be highly effective. In this modified arrangement the use of the jet of spill-flow fuel produced by line 11 and nozzle 13 is replaced by the longitudinal introduction of the spill flow into the inlet line 12 at the circumference of that line from an annular chamber 15 via feed passages 16 to a converging wall portion 17 whose transition to the circumferential surface of the inlet line 12 is so constructed that the flow from the passages 16 is retained at the wall surface by the Coanda wall-attachment effect. In this manner the kinetic energy of the spill flow is effectively utilised to increase the total pressure at the inlet 4a of the main fuel pump 4.

FIGS. 3 and 4 illustrate modified jet-injector arrangements which may also be used instead of the simple V-junction jet injector 9 of FIG. 2.

In the arrangement of FIG. 3 the fuel line 12 is formed with a Venturi portion 14, and the injection line 11a enters radially through the wall of the Venturi throat, its nozzle portion 13a being bent-over by 90° to form along the axis of line 12 a high-velocity jet of fuel returned by the spill line 8, this jet being directed at the main-pump inlet 4a.

In the alternative arrangement of FIG. 4 the line carrying the fuel supplied by the fuel-backing pump 3 is formed with a 90° L-bend 12a, by which the fuel from backing pump 3 enters a rectilinear portion 12b leading to the inlet of the main fuel pump 4. This permits not only the injection nozzle but also the injection line 11b to be arranged in axial alignment with the entry portion 12b of the fuel-supply line 12, thus avoiding a deflection of the spill flow shortly before its acceleration in the nozzle portion 13b and thus improving the efficiency of the latter.

It will be readily appreciated from the foregoing that, provided that sufficient spill flow is available, the invention will permit the booster pumps of the individual fuel pumps to be switched off immediately after starting of the turbine engine and kept inoperative except when, while flying at high altitude with fuel from a near-empty tank, there is a risk of a vapour lock in the line from the tank 1 to the inlet of the fuel-backing pump 3, and even then the booster pumps 2 can be switched off again when, with approach to ground level, the ambient pressure rises, that is to say before there is any appreciable risk of a crash.

Consideration of FIGS. 5 and 6 will show that in practice sufficiency of the volume of spill flow for the purposes of the present invention will be ensured without any need of increasing the size of the main fuel pump.

In FIG. 5 the total amount of the fuel flow delivered by the engine-driven fixed-displacement pump 4 as a function of the engine speed is shown as a straight line A through the origin O of the co-ordinate system, while the fuel requirement of the engine at sea level, at 10,000ft above sea level, and at 20,000 ft above sea level are shown by curved lines B, C and D respectively. By comparison of lines B, C and D with line A it will be readily observed that, except when the engine is required to run at near-maximum speed at sea level, there is a considerable surplus of the flow delivered by the main fuel pump over the fuel requirements of the engine, and accordingly a considerable available spill flow in spill line 8.

In FIG. 6 the pressure rise provided by the fuel-backing pump 3 is plotted as a function of the fuel flow, the highest curve E representing these values at sea level, while curves F and G respectively represent these values at 10,000 and at 20,000 ft above sea level.

It will be readily apparent that at sea level the fuel backing pump will be able to supply substantially its maximum pressure rise throughout its speed range, and that even at heights of 10,000 abd 20,000ft near-maximum pressure rise is maintained until approximately half the maximum flow is reached, while beyond this flow value there is a progressive decrease in the available pressure gain, a decrease which becomes more pronounced at the higher altitude.

A refereence to FIG. 5, shows, however that under the very conditions at which the pressure gain of the backing pump is liable to become inadequate, a very considerable spill flow is available for the purposes of the present invention from the delivery of the main fuel pump even if the latter is so designed as to be merely adequate to cover maximum engine requirements when operating at maximum speed under sea-level ambient pressure.

We claim

1. A system for supplying fuel to a gas-turbine engine of an aircraft, which comprises: a fuel tank; a positive-displacement main fuel pump driven at a speed proportional to that of the engine and having an inlet connected to said tank by a fuel-intake line, and an outlet leading to said engine; a booster pump arranged in at least close proximity to the tank and operable to raise the pressure energy of liquid fuel entering said line from said tank, said booster pump having driving means independent of the engine; a backing pump included in said line between said booster pump and said main fuel pump for simultaneous operation with the main fuel pump to raise the pressure of liquid fuel entering the main fuel pump from said line; fuel regulator means interposed between said outlet of the engine and operative to return to said intake line the excess of the fuel delivered by said main fuel pump over the momentary fuel requirements of the engine; a jet pump interposed between the backing pump and the inlet of the main fuel pump to raise the pressure of the liquid entering the main fuel pump from the backing pump, said jet pump having a jet inlet arranged to be fed with fuel thus returned by said regulating means and switch-off means operable to de-energise the driving means of the booster pump without affecting the operation of the main fuel pump and the backing pump.

2. A system for supplying liquid fuel to a gas turbine engine of an aircraft, which comprises: a fuel tank remote from the engine; a positive-displacement main fuel pump arranged adjacent to the engine and driven at a speed proportional to that of the engine, said main fuel pump having an inlet connected to the said tank by a fuel-intake line, and an outlet leading to said engine; a booster pump arranged in at least close proximity to the tank and operable to raise the pressure of liquid fuel entering said intake line from said tank, said booster pump having driving means independent of the engine; a backing pump arranged in proximity to the main fuel pump for simultaneous operation with the main fuel pump to raise the pressure of liquid fuel entering the main fuel pump from said line; an automatic regulator interposed between said outlet and the engine and operative to divert to a return line the excess of the fuel delivered by the fuel pump over the momentary fuel requirement of the engine; a jet pump interposed between the backing pump and the inlet of the main fuel pump to raise the pressure of the liquid fuel entering the main fuel pump from the backing pump, said jet pump having a jet inlet arranged to form the outlet of said return line; and switch-off means operable to de-energise the driving means of the booster pump without affecting the operation of the main fuel pump and the backing pump.

3. A system as claimed in claim 2, wherein said main fuel pump is dimensioned for a maximum delivery which exceeds only by a safety margin the maximum flow that the automatic fuel regulator permits to reach the engine.

4. A system as claimed in clam 2, wherein the jet pump includes an injection pipe which forms the end of the return line, said injection pipe being arranged to form a jet whose direction substantially coincides with the direction of flow of the fuel entering the jet pump from the fuel-intake line.

5. A system as claimed in claim 2, wherein the jet pump is of the Coanda type, the fuel coming from the return line being arranged to enter the flow of the fuel coming from the intake line through wall apertures so arranged as to cause the returned fuel to adhere to the walls of the jet pump due to the Coanda effect.

* * * * *